United States Patent [19]

Okuyama et al.

[11] 4,344,025
[45] Aug. 10, 1982

[54] MOTOR CONTROL SYSTEM

[75] Inventors: Toshiaki Okuyama; Yuzuru Kubota; Hiroshi Nagase, all of Hitachi; Katsunori Suzuki, Takahagi, all of Japan

[73] Assignee: Hitachi, Ltd., Tokyo, Japan

[21] Appl. No.: 70,725

[22] Filed: Aug. 29, 1979

[30] Foreign Application Priority Data

Sep. 4, 1978 [JP] Japan ............................ 53-107617

[51] Int. Cl.³ ............................................. H02P 5/40
[52] U.S. Cl. .................................... 318/729; 318/803; 318/810
[58] Field of Search ............... 318/729, 802, 807, 808, 318/809, 810, 811, 799, 801, 800, 717; 323/102, 118, 207, 205; 363/79, 161

[56] References Cited

U.S. PATENT DOCUMENTS

| 3,383,575 | 5/1968 | Bobo | 318/717 |
|---|---|---|---|
| 3,419,785 | 12/1968 | LaFuse | 363/79 |
| 3,686,552 | 8/1972 | Peterson | 318/717 |
| 3,896,348 | 7/1975 | Loderer | 318/810 |
| 4,052,648 | 10/1977 | Nola | 318/310 |
| 4,121,150 | 10/1978 | Kelley, Jr. | 323/102 |
| 4,129,809 | 12/1978 | Rosa | 363/161 |
| 4,158,801 | 6/1979 | Hirata | 318/809 |
| 4,186,334 | 1/1980 | Hirata | 318/810 |

FOREIGN PATENT DOCUMENTS

| 54-106812 | 8/1979 | Japan | 318/809 |
|---|---|---|---|
| 614511 | 7/1978 | U.S.S.R. | 318/809 |

Primary Examiner—David Smith, Jr.
Attorney, Agent, or Firm—Craig and Antonelli

[57] ABSTRACT

A motor control system controls to be constant a reactive power consumed by a motor load equipment having a motor to be driven by power supplied from an AC power source and a couple of thyristor converters for regulating the power supplied to the motor. To this end, the motor control system is comprised of a reactor power detector for detecting the reactive power of the motor load equipment, a command circuit for issuing a command to specify the rated reactive power consumed in the rated load running of the motor load equipment, and a reactive power control unit which receives an output signal from the command circuit and an output signal from the reactive power detector to produce a firing phase command signal depending on a difference between them. The firing phase command signal from the reactive power control unit is applied to an automatic pulse phase shifter to control the firing phase of the thyristor converters.

9 Claims, 6 Drawing Figures

MOTOR CONTROL SYSTEM

BACKGROUND OF THE INVENTION

The present invention relates to a motor control system for properly controlling the reactive power of motor load equipment including a motor and a couple of power converters connected in series to regulate the power supplied to the motor.

In general, motor load equipment is operated while coupled with an AC power source. In this case, the motor load equipment is supplied with effective power and reactive power from the AC power source, so that the power factor of the power source is reduced. The reactive power consumed in the motor load equipment is lagging reactive power. To neutralize it, phase modifying equipment (for example, a condensor for improving the power factor) to consume leading reactive power is connected to the AC power source. Accordingly, the reactive power viewed from the power source side becomes small, so that the power factor of the power source is kept high.

However, the lagging reactive power consumed by the motor load equipment greatly varies depending on the operating condition. Particularly, in a light load running of the motor, the lagging reactive power consumed by the motor load equipment becomes small while the leading reactive power supplied from the phase modifying equipment becomes excessively large. In the case of the light load running, the phase modifying equipment excessively compensates the power factor, so that the power source voltage rises beyond a target value for regulation. In order to prevent such an abnormal rise of the power source voltage, a contactor by convention is provided between the phase modifying equipment and the power source, and in the light load running, the contactor is opened to disconnect the phase modifying equipment from the power source.

This method to connect or disconnect the phase modifying equipment to and from the power source by means of a contactor, however, fails to continuously control the reactive power.

SUMMARY OF THE INVENTION

Accordingly, an object of the invention is to provide a motor control system which is capable of continuously controlling the reactive power to be substantially constant, for the purpose of preventing the abnormal rise of the power source voltage due to a load variation.

Another object of the invention is to provide a motor control system capable of continuously regulating reactive power with a mere addition of a simple device.

One of the features of the invention is to control the firing phase of a power converter in such a manner that a variation of the reactive power consumed by the motor load equipment is detected and the variation is compensated.

Other objects and features of the invention will be apparent from the following description taken in connection with the accompanying drawings, in which:

DETAILED DESCRIPTION OF THE PREFERRED EMBODIMENTS

Figure 1:
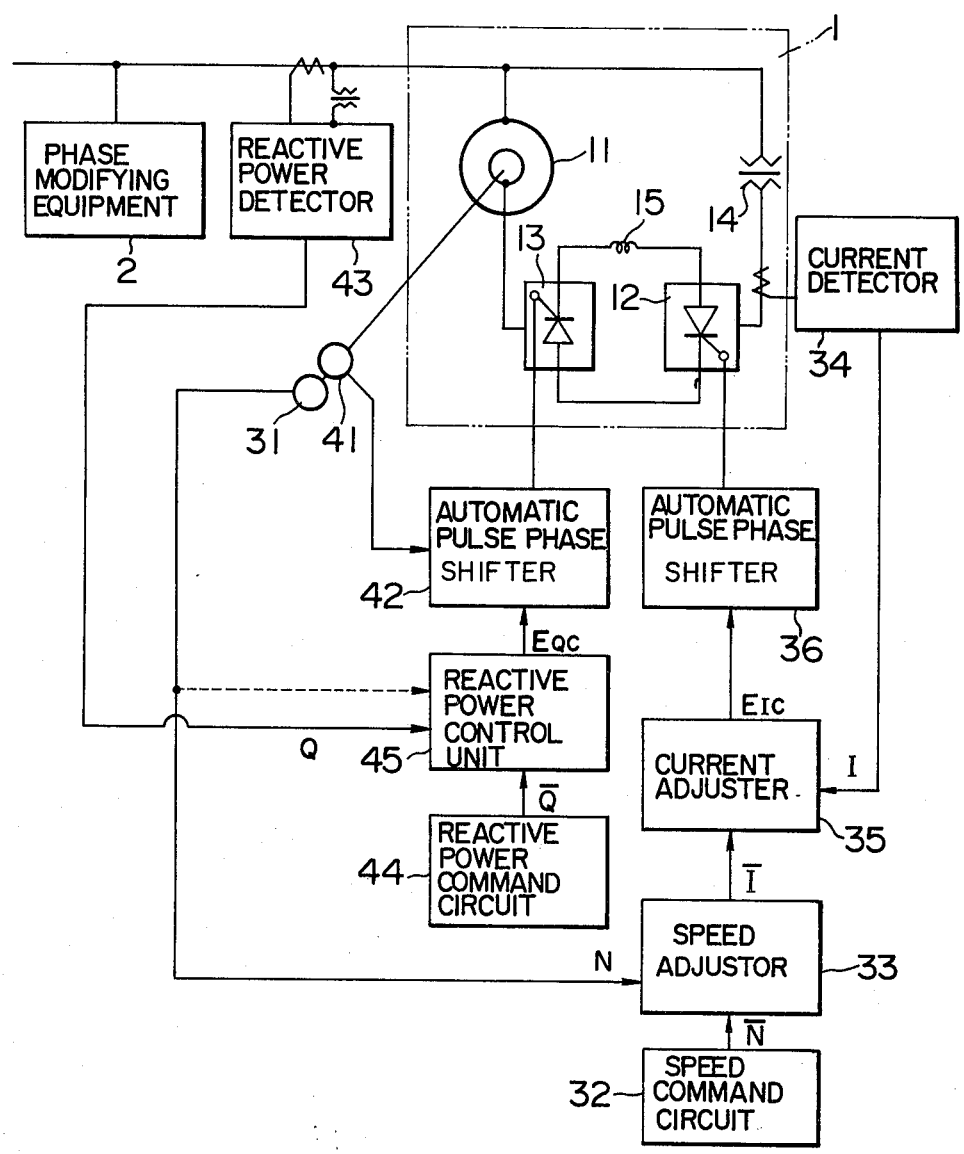
FIG. 1 shows a block diagram of an embodiment of a motor control system according to the invention.

FIG. 1 shows an embodiment of a motor control system according to the invention. In the figure, reference numeral 1 shows a motor load equipment connected to an AC power source. The motor load equipment has a wound-rotor type motor 11, a first thyristor power converter 12, a second thyristor power converter 13, a transformer 14, and a DC reactor 15. The first converter 12 is connected through the transformer 14 at its AC side to the AC power source and through the DC reactor at its DC side to the DC side of the second converter 13. The second converter 13 is connected at its AC side to the secondary winding of the motor 11. Reference numeral 2 designates a phase modifying equipment connected to the AC power source for compensating a lagging reactive power consumed by the motor load equipment 1. The phase modifying equipment is used to neutralize the lagging reactive power in the motor load equipment, and includes a condensor for advancing the phase of the power current (for improving the power factor). Reference numeral 31 designates a speed detector for detecting a speed N of the motor; 32 a speed command circuit for producing a command signal $\overline{N}$ for specifying a motor speed; 33 a speed adjustor for producing a current command signal $\overline{I}$ corresponding to a different signal $\Delta N$ between the output signal N of the speed detector 31 and the speed command $\overline{N}$; 34 a current detector for detecting a current I at the AC side of the thyristor converter 12; 35 a current adjustor for producing a first firing phase command signal $E_{IC}$ in accordance with the difference between an output signal from the current detector and the current command signal; 36 an automatic pulse phase shifter (APPS) for producing a pulse to control the firing phase of the first converter 12; 41 a phase detector for detecting a reference phase of an induced power induced in the secondary winding of the motor; 42 an automatic pulse phase shifter (APPS) for producing a pulse to control the firing phase of the second converter 13 by a second firing phase command signal inputted thereto; 43 a reactive power detector for detecting a reactive power Q consumed by the motor load equipment 1; 44 a reactive power command circuit producing a reactive power (rated reactive power) consumed in the rated running of the motor as a command value $\overline{Q}$; 45 a reactive power control unit for producing the second firing phase command signal $E_{QC}$ in accordance with a signal $\Delta Q$ representing a difference between an output signal of the reactive power detector 43 and the reactive power command value. Here, the APPS is so designed that, when the command signal $E_{QC}$ is small, it fires the converter at a phase angle larger than the phase represented by the command signal.

In operation, the speed command circuit 32 produces a speed command value $\overline{N}$ of the motor for transfer to the speed adjustor 33. Upon receipt of the speed command value $\overline{N}$, the speed adjustor 33 produces such a current command value $\overline{I}$ as to cancel a difference $\Delta N$ between the speed command value $\overline{N}$ and the real motor speed N (an output signal from a speed detector). The current adjustor 35 produces a firing phase control signal $E_{IC}$ in accordance with a difference between the current command value $\overline{I}$ and an output signal from the current detector 34. The APPS 36 produces a firing pulse for transfer to the first converter 12 in response to the firing phase control signal $E_{IC}$ to control the firing angle of the first converter 12.

With the construction mentioned above, the motor speed is constantly controlled to a value approximate to a speed command value $\overline{N}$. When the motor speed is below the synchronizing speed, the first converter 12 performs a reverse conversion. When it is above the synchronizing speed, the converter 12 performs a forward conversion. In this case, the operation of the second converter 13 operates in the reverse mode is that of the first converter.

The reactive power command circuit 44 produces a rated reactive power $\overline{Q}$. The reactive power control unit 45 receives the command value $\overline{Q}$ and a real reactive power Q (the output signal from the reactive power detector 43) and produces a firing phase command signal $E_{QC}$ to zero a difference between them. Depending on the signal $E_{QC}$, the APPS 42 controls the firing phase of the second converter 13. A reference phase to control the firing phase is taken out from the phase detector 41. In this way, the reactive power control unit 45 effects such a control that the real reactive power Q always coincides with the command value $\overline{Q}$. Thus, the reactive power is controlled to be approximately the command value $\overline{Q}$.

Assume now that the load for the motor becomes a light load. At this time, the lagging reactive power consumed by the motor load controller 1 reduces and the detected value Q by the reactive power detector 43 becomes a small value, so that some difference value appears between the real reactive power Q and the command value $\overline{Q}$. At this time, the control unit 45 produces a firing phase command signal $E_{QC}$ smaller than the output signal $E_{QC}$ of the control unit 45 which has ever been produced. Accordingly, the APPS 42 produces a firing pulse representing a larger firing angle than the firing phase till then. Upon receipt of the firing pulse, the second converter 13 is fired with a larger phase, so that the reactive power increases. The difference-zeroing control is continued until the output of the reactive power detector 43 is coincident with the command value. By changing the firing phase of the second converter 13, the motor current varies, so that the motor speed is in a movable state. At this time, however, the speed adjustor 33 produces a new current command value to minimize the speed variation, and the current adjustor 35 produces a firing phase command signal $E_{IC}$ to provide a current coincident with the new current command value. The APPS 36 produces a pulse for firing the first converter 12 at the phase commanded. The firing phase of the first converter is controlled by such a firing pulse, so that the motor speed restores to its former speed. In this way, the control system to make the motor speed constant and another control system to make the reactive power constant control the respective values to be coincident with their target values while interacting with each other. As a result, the motor speed and the reactive power may be controlled to be constant irrespective of a variation of the load. By keeping the reactive power at a pregiven value, a variation of the power source voltage is prevented and particularly the abnormal rise of the power source voltage in the light load running is preventable.

Figure 2:
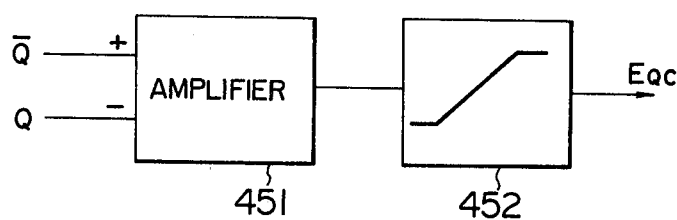
FIG. 2 shows a block diagram of a reactive power control unit as one of the constitutional components in the circuit shown in FIG. 1.

The details of the reactive power control unit 45 shown in FIG. 1 will be described with reference to FIG. 2. In FIG. 2 illustrating in block form an example of the reactive power control unit 45, the signal (the output signal from the speed detector 31) indicated by broken line in FIG. 1 is not inputted to the control unit 45. In FIG. 2, reference numeral 451 designates an integrator type amplifier for producing a signal in accordance with a difference $\Delta Q$ between the command value $\overline{Q}$ of the reactive power and the real reactive power Q. Reference numeral 452 designates a limiter. When the output signal from the amplifier 451 lies outside of a range permitting a stable firing control of the second converter 13, the limiter 452 limits the output signal to fall within the stable control range. When the real reactive power shifts from the pregiven value, the amplifier 451 produces a control signal corresponding to the difference between the real reactive power and the pregiven value. The control signal is then applied to the limiter 452. When the control signal inputted is within a limit value, the limiter 452 provides the control signal inputted as a firing command signal $E_{QC}$ as it is. When the control signal inputted exceeds the upper limit or the lower limit of the limit value, the limiter 452 limits the control signal inputted to be the upper or the lower limit and produces the limited value as a firing phase command signal $E_{QC}$.

The reason for the provisions of the upper and the lower limits in the firing phase command signal by using the limiter 452 will be described. When the second converter performs the forward conversion (when the motor operates at a speed lower than the synchronous speed), the firing angle control is performed in a lagging angle control mode, so that the lagging angle $\alpha$ may be controlled within an angle range 0° to 90°. On the other hand, when the second converter performs the reverse conversion (when motor operates at a speed larger than the synchronous speed), the firing control is performed in a leading angle control mode. Accordingly, a leading angle $\beta$ can not be controlled below a commutation margin angle U in order to prevent the commutation failure. Accordingly, the leading angle $\beta$ must be changed within a range between 0° to 90°. Therefore, the minimum value of the firing angle must be limited in order to ensure a stable running of the motor in both the forward and the reverse modes, and thus the maximum value of the firing phase command signal $E_{QC}$ is limited. The upper limits of the leading and lagging angles $\beta$ and $\alpha$ are controllable both up to 90°. In the light load running of the motor, however, it is not necessary that the reactive power consumed by the second converter is increased above the rated reactive power of the motor load equipment. To this end, the maximum values of $\alpha$ and $\beta$ are limited. That is to say, the minimum value of the control signal $E_{QC}$ is limited in order to limit the maximum values of $\alpha$ and $\beta$.

In the example of FIG. 2, the limiter 452 is used to make the minimum value of the lagging angle $\alpha$ in the forward conversion equal to that of the leading angle $\beta$ in the reverse conversion. However, since $\alpha = 0°$ to 90° and $\beta = U$ to 90°, the adjusting ranges may be widened up to the limit values $\alpha = 0$ and $\beta = U$, respectively, by merely detecting the fact that the forward or reverse conversion is made.

Figure 3:
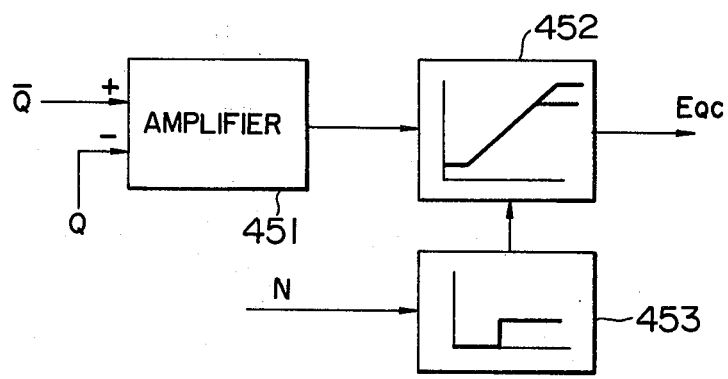
FIG. 3 shows a block diagram of another example of the reactive power control unit shown in FIG. 1.

FIG. 3 shows a modification of the reactive power control unit 45 in which the limit value of the firing phase is changeable depending on the conversion mode, that is, whether it is the forward or the reverse conversion. In the example shown in FIG. 3, the reactive power control unit 45 receives an output signal from the speed detector 31, which is indicated by broken line in FIG. 1. In FIG. 3, reference numerals 451 and 452 designate an amplifier and a limiter, respectively, as in the case of FIG. 2. Reference numeral 453 denotes a bias circuit to adjust the upper limit of the limiter. The output signal N from the speed detector 31, representing the motor speed, is applied to the bias circuit 453. The bias circuit 453 produces binary bias signals respectively corresponding to the cases where the motor speed is below and above the synchronous speed. It is when the motor speed is below the synchronous speed that the second converter 13 operates in the forward conversion mode. Similarly, it operates in the reverse conversion mode when the motor speed is above the synchronous speed. Accordingly, bias signals produced are different when the motor speed is above and below the synchronous speed. The bias signal (voltage signal) adjusts a voltage to specify the upper limit of the limiter 452. In this way, the upper limit of the limiter is changed.

Figure 4:
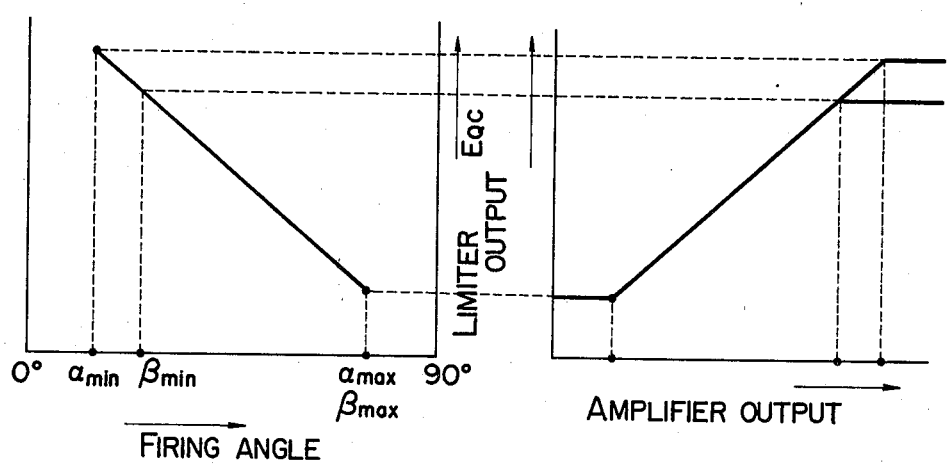
FIG. 4 shows graphs useful in explaining the control operation of the reactive power.

In FIG. 4, there are shown a relationship between the output of the amplifier 451 of the reactive power control unit and the output signal from the limiter 452 and a relationship between the output signal from the limiter and the firing angle. When the output signal from the amplifier 451 exceeds a given value, the limiter 452 limits the command signal $E_{QC}$ and thus limits a firing phase angle, as seen from the graphs shown in FIG. 4. In the figure, $\alpha_{min}$ and $\alpha_{max}$ are a minimum value of the lagging phase angle and a maximum value of the same respectively. $\beta_{min}$ and $\beta_{max}$ are a minimum value and a maximum value of the leading phase angle in the inverse conversion respectively.

Figure 5:
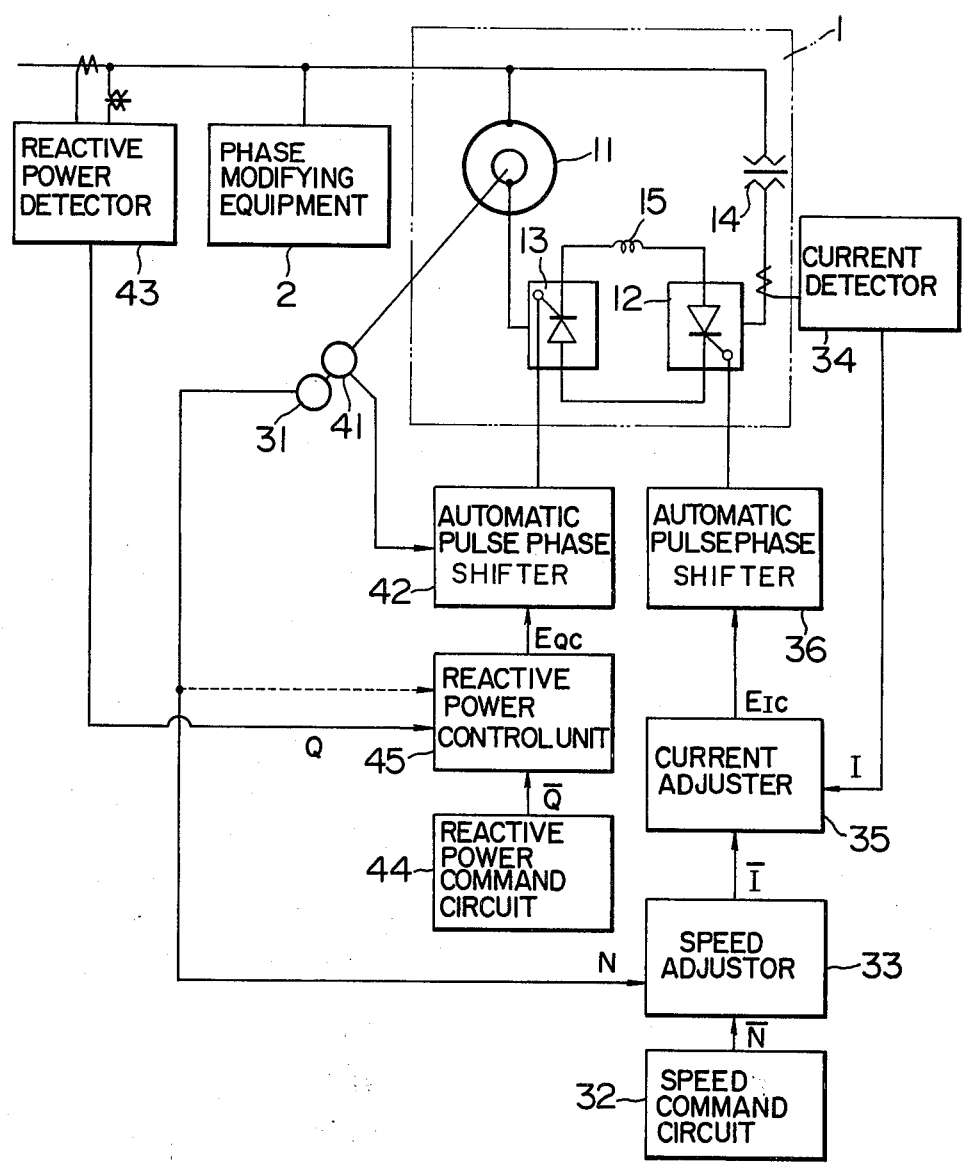
FIGS. 5 and 6 show block diagrams of other embodiments of the motor control system according to the invention.

Turning now to FIG. 5, there is shown another embodiment of the motor control system according to the invention. In FIG. 5, like symbols are used to designate like portions in FIG. 1. The operation of the motor control system in FIG. 5 is essentially the same as that of the embodiment shown in FIG. 1. The only difference between the systems resides in the connection of the reactive power detector 43 in the system circuit. Specifically, in the case of FIG. 1, the detector 43 detects the reactive power consumed by only the motor load equipment 1. In FIG. 5, the detector 43 detects a reactive power consumed by both the motor load equipment 1 and the phase modifying equipment 2. In this case, the detector 43 produces a difference component obtained when the reactive power consumed by the motor load equipment 1 is compensated by the phase modifying equipment 2. Accordingly, the reactive power control unit 45 has only to modify an output signal produced from the reactive power command circuit 44 by the difference component and to produce the modified signal.

Figure 6:
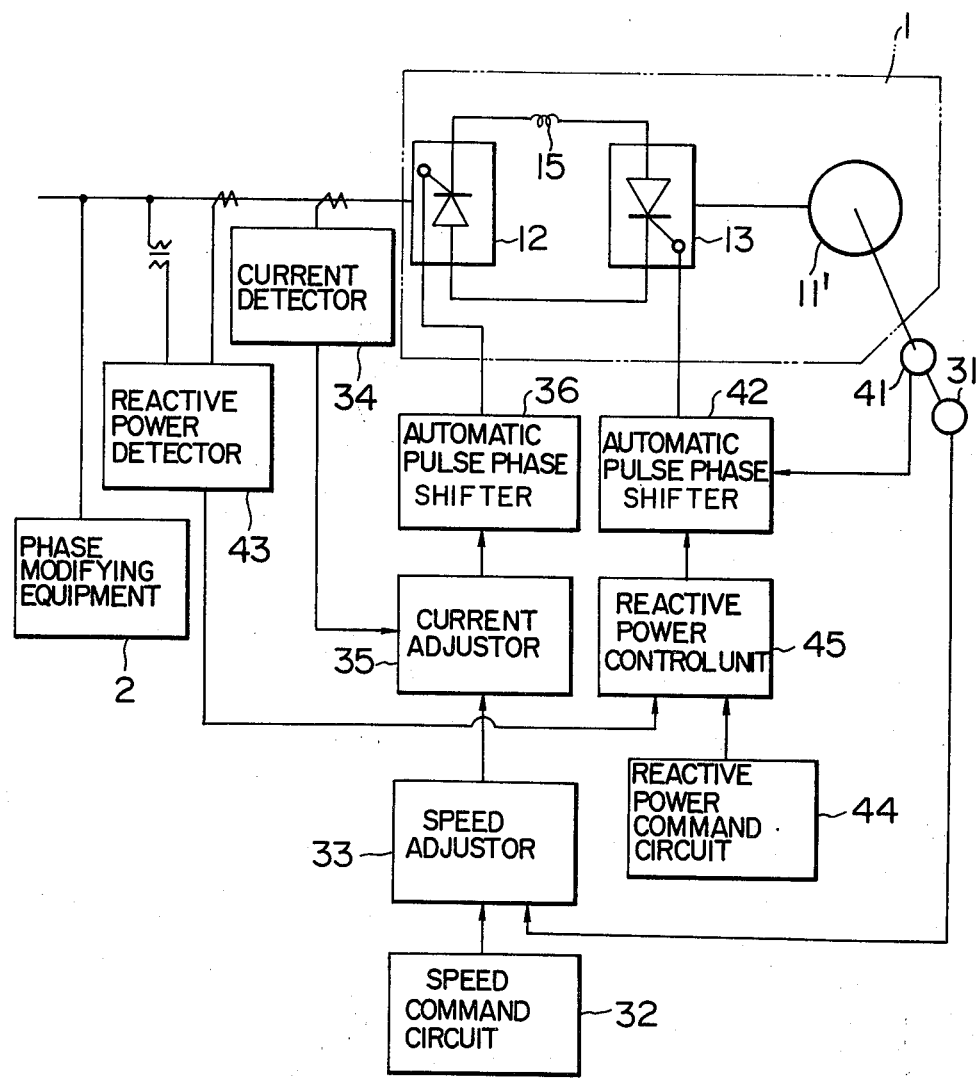

FIG. 6 shows still another embodiment of the motor control system according to the invention. In the figure, like reference symbols designate like portions in FIG. 1. In FIG. 6, reference numeral 11' is representative of a synchronous motor. Like the embodiment shown in FIG. 1, through the control of a firing phase angle (a lagging phase angle) of a first converter 12, the APPS 36 feeds a command current issued from the speed adjustor to the synchronous motor, thereby to control the motor to the same speed as that of the command value. On the other hand, the APPS 42 controls the firing angle (leading angle) of the second converter 13 in order that the reactive power consumed by the motor load equipment is coincident with the command value applied from the reactive power command circuit 44. Since the reactive power detector 43 detects the reactive power consumed by the motor load equipment 1, the command value given by the reactive power command circuit 44 corresponds to the reactive power consumed by the motor load equipment at the time of the rated running. Evidently, in this embodiment, the reactive power detector 43 may detect the reactive power consumed by both the motor load equipment and the phase modifying equipment, like the embodiment shown in FIG. 5.

As seen from the foregoing, the embodiment mentioned above, directly detects the reactive power by using the reactive power detector 43. The invention is not limited to such a method in detecting the reactive power. A variation of the reactive power as viewed from the power source side is substantially proportional to the reactive component of current. Therefore, the reactive power may be detected by detecting the current reactive component. To this end, a reactive current detector for detecting the reactive component of current may be used in place of the reactive power detector and the output signal from the reactive current detector may be fed back for the reactive power control. In another modification, a voltage detector for detecting the power source voltage may be used as a substitue for the reactive power detector. In this case, a power source voltage signal detected by the voltage detector is used as a detected signal of reactive power for the same purpose. The reason why this modification is allowed is that the power source voltage varies in accordance with the reactive power variation also caused by a load variation.

As seen from the foregoing, the invention detects a variation of the reactive power consumed by the motor load equipment and compensates for the reactive power variation by controlling a firing angle of the converter included in the motor load equipment. Accordingly, the reactive power as viewed from the power source side may be continuously adjusted, thereby preventing an abnormal rise of the power source voltage in the light load operation.

What is claimed is:
1. A motor control system comprising:
a motor load equipment connected to an AC power source having a motor consuming power supplied from the AC power source and means connected to said motor including first and second converters connected in series for controlling the power to be consumed by the motor through control of the firing angle of said first and second converters;
phase modifying equipment connected to the power source and consuming a leading reactive power for compensating for a lagging reactive power at rated load running consumed by said motor load equipment;
a speed detector for detecting the speed of the motor;
a speed command circuit for providing a speed command signal for controlling the speed of the motor;
a speed adjustor for producing a current command value in accordance with a signal representing the difference between the speed detector output and the speed command signal;

a current detector for detecting the current flowing through said first and second converters;

a current adjustor for producing a first firing phase command signal in accordance with a signal representing the difference between the output of said current detector and the current command value;

a first automatic pulse phase shifter for controlling the firing phase of said first converter in response to said first firing command signal;

a second automatic pulse phase shifter for controlling the firing phase of said second converter;

a reactive power detector for producing an electrical signal corresponding to the reactive power consumed by said motor load equipment and/or said phase modifying equipment;

a reactive power command circuit for providing an electrical signal of a reactive power command value corresponding to that consumed by said motor load equipment in the rated load operation;

a reactive power control unit for applying a second firing phase command signal to said second automatic pulse phase shifter in accordance with a signal representing the difference between an electrical signal corresponding to said reactive power and said lagging reactive power command; and phase detector means for detecting a reference phase synchronized with the induced voltage of said motor, said second automatic pulse phase shifter being connected to receive the outputs of said reactive power control unit and said phase detector means to control the firing phase of said second converter.

2. A motor control system according to claim 1, wherein said reactive power control unit includes means for applying to said second automatic pulse phase shifter said second firing angle command signal corresponding to the difference between an electrical signal corresponding to said reactive power and said lagging reactive command value when said difference is in the range between given upper and lower limits, and for applying to said second automatic pulse phase shifter a signal with a given level corresponding to the upper or the lower limit when said difference is out of the range between the upper and the lower limits.

3. A motor control system according to claim 2, wherein said upper limit is so selected as to provide the second firing phase command signal which firing phase is as large as possible so long as the commutation of said second converter does not fail when the motor speed exceeds a synchronous speed.

4. A motor control system according to claim 1, wherein the reactive power detector for detecting a reactive power of said motor load equipment is used as said detector for producing an electrical signal corresponding to the reactive power.

5. A motor control system according to claim 1, wherein a reactive current detector for detecting the reactive component of current fed to said motor load equipment is used as said detector for producing an electrical signal corresponding to the reactive power.

6. A motor control system according to claim 1, wherein a voltage detector for detecting the voltage of said Ac power source is used as said detector for producing an electrical signal corresponding to said reactive power.

7. A motor control system comprising:

a motor with a primary winding connecting to an AC power source and a secondary winding;

a first converter connecting at its AC side to the AC power source;

a second converter connecting at its DC side to the DC side of said first converter and at its AC side to the secondary winding of said motor;

phase modifying equipment connected to the AC power source and consuming a leading reactive power corresponding to a lagging reactive power consumed by the motor in the rated running in order to improve the power factor of said motor;

a speed detector for detecting the speed of said motor; a speed command circuit for providing a speed command of said motor;

a speed adjustor for producing a current command value corresponding to a signal representing the difference between the output signal from said speed detector and the speed command;

a current detector for detecting current flowing through said first and second converters;

a current adjustor for producing a first firing phase command signal corresponding to a signal representing the difference between the output signal from said current detector and the current command value;

a first automatic pulse phase shifter for controlling a firing angle of said first converter by the first firing phase command signal;

a second automatic pulse phase shifter for controlling a firing angle of said second converter;

a reactive power detector for producing an electrical signal corresponding to the reactive power consumed by said motor, said first converter, and said second converter;

a reactive power command circuit for providing an electrical signal representing a lagging reactive power command value corresponding to the lagging reactive power consumed by said motor, said first converter and said second converter in the rated running of said motor;

a reactive power control unit for applying to said second automatic pulse phase shifter a second firing phase command signal corresponding to a signal representative of the difference between an electrical signal corresponding to said reactive power and the lagging reactive power command value; and phase detector means for detecting a reference phase synchronized with the induced voltage of said motor, said second automatic pulse phase shifter being connected to receive the outputs of said reactive power control unit and said phase detector means to control the firing phase of said second converter.

8. A motor control system according to claims 1 or 7, wherein said reactive power control unit comprises difference amplifier means for producing an output signal representing the difference between the output of said reactive power detector and the output of said reactive power command circuit, and limiter means connected to said difference amplifier means for limiting the output signal thereof to predetermined upper and lower limit values.

9. A motor control system according to claim 8, wherein said reactive power control unit further comprises bias means responsive to the output of said speed detector for adjusting the upper limit value of said limiter means.

* * * * *